United States Patent [19]

Browne et al.

[11] Patent Number: 4,817,465

[45] Date of Patent: Apr. 4, 1989

[54] ROTARY TABLE FOR BAKERY PRODUCT SLICER

[75] Inventors: Ronald O. Browne; Martin A. Grano, both of Santa Barbara, Calif.

[73] Assignee: Food Tools, Inc., Santa Barbara, Calif.

[21] Appl. No.: 946,416

[22] Filed: Dec. 23, 1986

[51] Int. Cl.[4] .......................... B23B 29/24; F16H 29/04
[52] U.S. Cl. .......................................... 74/817; 74/117; 74/600
[58] Field of Search ............. 74/116, 117, 126, 813 R, 74/816, 817, 827, 837, 600

[56] References Cited

U.S. PATENT DOCUMENTS

| 489,398 | 1/1893 | Towne | 74/817 |
|---|---|---|---|
| 845,073 | 2/1907 | Franke | 74/126 |
| 1,401,539 | 12/1921 | Knapp et al. | 74/117 |
| 2,632,339 | 3/1953 | Lane | 74/117 |
| 2,904,167 | 9/1959 | Guess | 74/117 |
| 3,103,825 | 9/1963 | Bryant | 74/116 |
| 3,267,754 | 8/1966 | Bouchez | 74/117 |
| 4,565,053 | 1/1986 | Browne et al. | 53/516 |

FOREIGN PATENT DOCUMENTS

| 256551 | 2/1913 | Fed. Rep. of Germany | 74/117 |
|---|---|---|---|
| 362842 | 11/1922 | Fed. Rep. of Germany | 74/600 |
| 860430 | 7/1949 | Fed. Rep. of Germany | 74/600 |
| 1198058 | 6/1959 | France | 74/117 |
| 3239 | 2/1911 | United Kingdom | 74/837 |

*Primary Examiner*—Lawrence Staab
*Attorney, Agent, or Firm*—Donald D. Mon

[57] ABSTRACT

A rotary table for a bakery product slicer in which mechanism is provided that for a given length of crank throw can be adjusted to rotate a turntable through selectably adjustable angular increments.

5 Claims, 3 Drawing Sheets

ROTARY TABLE FOR BAKERY PRODUCT SLICER

FIELD OF THE INVENTION

This invention relates to an indexer that rotates a turntable which supports a bakery product such as a cake which is to be sliced into a selectable number of wedge-shaped portions.

BACKGROUND OF THE INVENTION

Up-scale stores and eating establishments regularly make available snack and dessert items which are quite exepnsive, both for the customer to buy and for the merchant to stock. The term "bakery product" as used herein is intended to mean any circularly-shaped comestible that is intended to be divided into individual wedge-shaped portions. Examples are various mousse pies, cakes of complicated formulation and construction, and occasionally even ice cream products.

Most frequently the bakery product is first sold as an entire unsliced article. Then its division into individual portions is done by servers, who wield a knife and spatula for the purpose. It seems that the merchant loses at least one portion of each article because of clumsiness of the server, especially in removing the first portion, or because of failure accurately to divide the article, or because of the quietly willful spoilage that gives the server a slice to eat or to share, because it is not in good enough condition to sell after it has been removed from the article.

There has been proposed a slicer which utilizes a blade to force folded pieces of wax paper into the article at accurately spaced-apart locations. These are inserted while the article is in a softly frozen condition. The portions can readily be removed and the wax paper discarded, and every slice is perfect. In fact, in many operations the article is shipped with these inserts already in place. The servers no longer need to exercise any judgement or special care. One such machine is shown in U.S. Pat. No. 4,565,053 issued to Browne et al on Jan. 21, 1986, which is incorporated herein in its entirety for its showing of the general concept of such a machine.

The said machine has enjoyed a substantial acceptance. It incorporates a turntable which rotates beneath a knife blade that extends across a diameter of the turntable. A folded sheet of waxed paper is doubled over the lower end of the blade. When the blade is pressed into the article, it is shielded by the paper, and serves both to part the article and to force the paper into the article at the part. The paper remains in place after the blade is removed. The blade moves only up and down. To make successive cuts, the turntable is indexed through an appropriate angle and then stopped, and the blade again is pressed into the article. Obviously, the correct indexing of the article is critical to the correct function of the device. An indexing mechanism is part of the machine shown in the said Browne patent.

Food machinery of this class must meet some requirements that are not commonly confronted. For example, in Class A bakery operations, it is necessary for the mechanism to withstand very hot water or steam for clean up. Also, the same machine must be adaptable to divide articles into various numbers of portions, which numbers must be selectable. The skills of the operators of such machinery are widely variable, and it is therefore important for the selection means to be simple in concept and manipulation. It is an object of this invention to meet those objectives.

BRIEF DESCRIPTION OF THE INVENTION

An indexer according to this invention includes a base with a vertical post rising from it. The post has an upright axis. A turntable is supported by the post, and is unidirectionally rotatable around it. An oscillator is rotatably fitted around the post, and includes a retractable tang adapted drivingly to engage and drive the turntable in one direction, and to retract from it in the opposite direction and thereby leave the turntable in its advanced position. Oscillation of the oscillator will advance the turntable through a predetermined, selected, angle for each actuation.

A crank arm is provided to drive the oscillator. It comprises a rotary drive arm mounted to the base by a shiftable mounting block. A connecting rod interconnects the crank arm and the oscillator. Motion of the mounting block toward and away from the post permits adjustment of the effective radius of the crank arm. This adjusts the length of the stroke derived from an established angle of crank rotation, and thereby adjusts the angle through which the turntable will be rotated for each reciprocation of the crank arm.

Handle means or power means, or both, may be provided to drive the crank arm, whose angular movement is always the same.

The above and other features of this invention will be fully understood from the following detailed description an the accompanying drawings, in which:

DETAILED DESCRIPTION OF THE INVENTION

Figure 1:
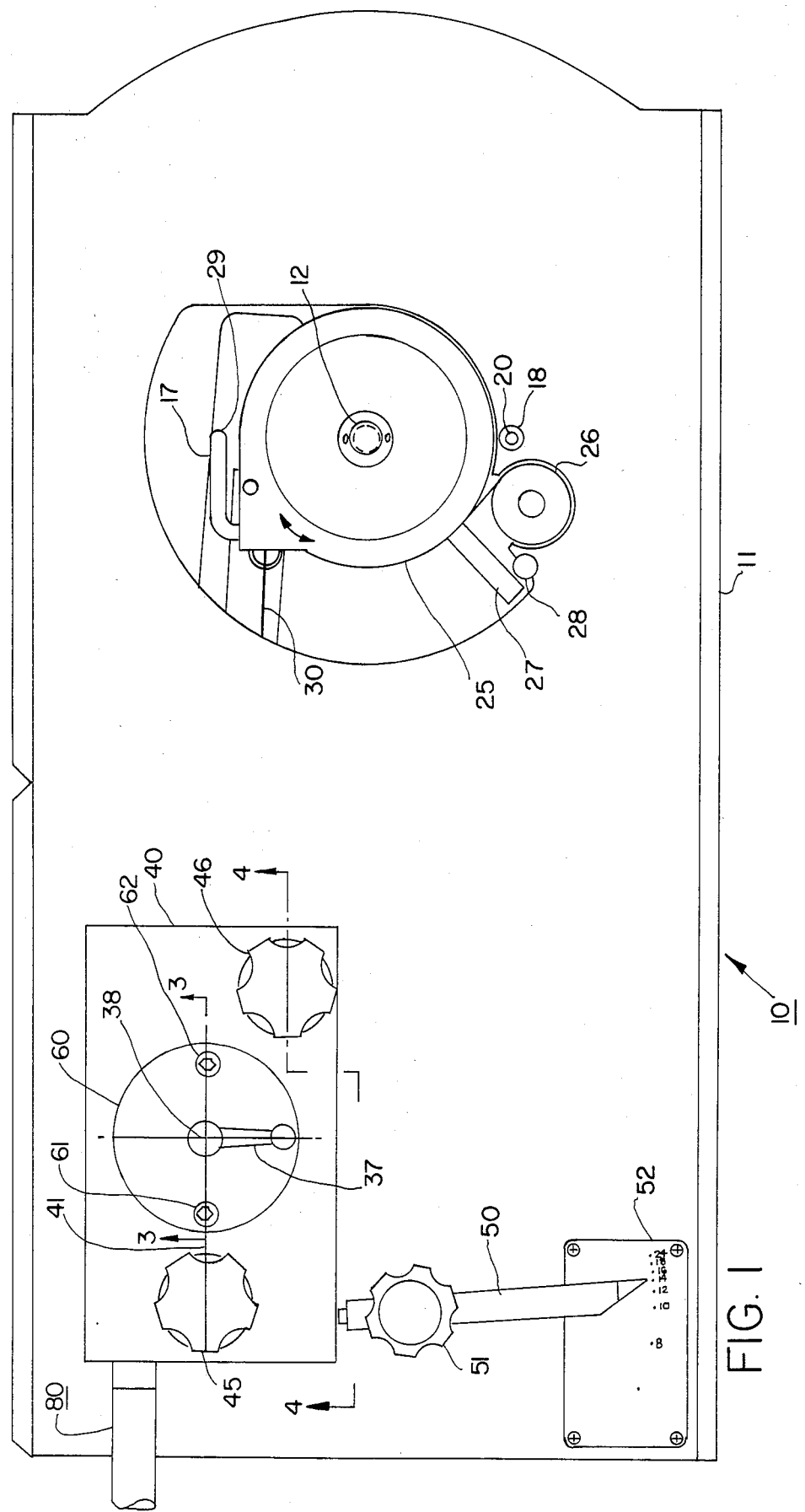
FIG. 1 is a top plan view of the indexer according to the invention.
Figure 2:
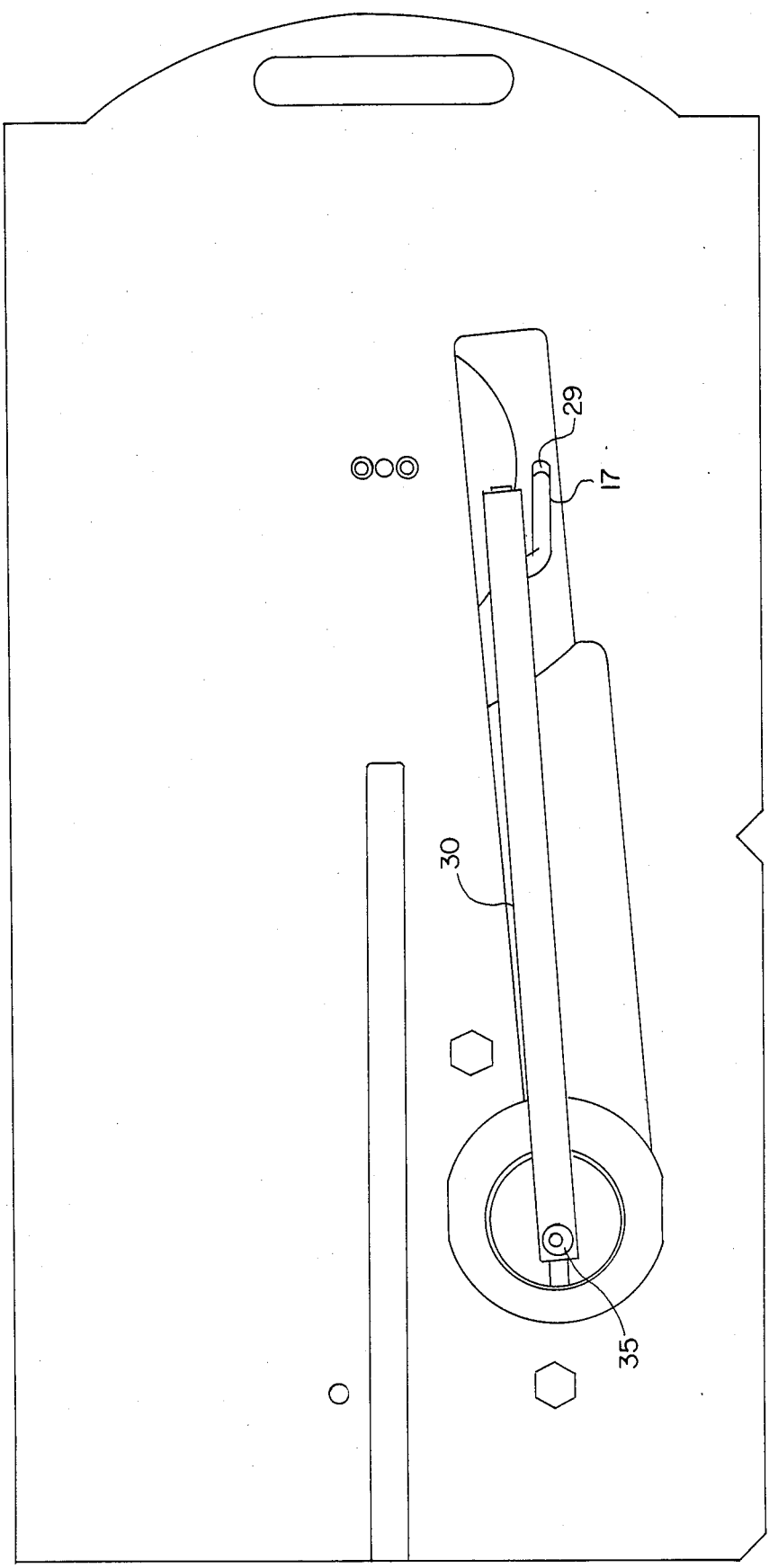
FIG. 2 is a bottom view of the indexer.

An indexer 10 according to the invention has a supporting base 11. A post 12 having a vertically oriented axis 13 rises from the base. It supports a turntable 14 that is freely rotatable on it. An article (not shown) to be sliced is placed atop the worktable, and a blade (not shown) extends across the diameter directly above axis 13. The blade is pressed into the cake to cut it, and it inserts the paper into the cake as described in the Browne patent.

In the bottom surface of the turntable there is a series of drive recesses 16 engageable by a tank 17 which is driven through an angular increment that determines the number of slices into which the cake is to be divided. A spring loaded detent pin 18 in the base is engageable in these recesses to hold the turntable in the position to which the drive has driven it. It has a tapered end 20 so it can be forced down against its bias spring, but asserts a sufficient retentive force to overcome the momentum of the cake and of the turntable so they will stop at the end of a stroke. While this is optional, because the device could instead utilize a drag means, the most practical device will include a detent.

Thus, once a turntable with the predetermined number of recesses is provided, it is only necessary to provide means to index the turntable from stop to stop. Obviously, it will not do to drive the turntable beyond the stop, or not to drive it far enough. The detent mechanism is more forgiving of the drive mechanism, because it will center the turntable at each stop. Still, it is optional if the turntable is provided with means to avert coasting beyond the desired place stop, and the drive pushes it to the exactly desired place.

The tank is carried by a drive plate 25 of an oscillator which is also freely rotatable on the post. It is spring-biased by a coiled strip spring 26 that biases plate 25 counterclockwise in FIG. 1. A stop 27 on plate 25 is adapted to abut stop 28 on the base to oppose counterclockwise rotation and establish a base point reference.

Figure 5:
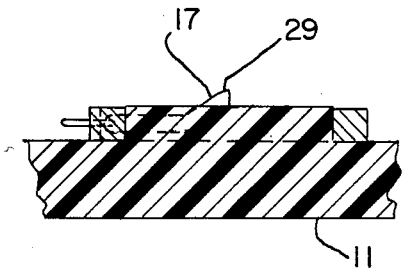
FIG. 5 is a fragmentary section taken in FIG. 3.

The tank is spring loaded so that its tip 29 (FIG. 5) is biased upward toward the turntable. A sufficient downward force, such as by camming, will retract it.

A connecting rod 30 carries a pivot pin 31 at one end. This serves drivingly to connect that end of the connecting rod to the drive plate of the oscillator at a position radially spaced from the turntable axis. Reciprocation of the connecting rod will oscillate the drive plate between the position established by the stops and a position to which the rod turns the drive plate.

The other end 35 of the connecting rod is connected by a pivot pin 36 to a drive crank 37. In the operation of this device, the drive crank will be driven through an angle that is the same for all settings usually about 180 degrees. The amount of "throw", i.e., the distance the connecting rod is moved, is determined by the distance between the central axis 38 of the crank arm, and the center of pivot pin 36. This distance is adjustable, and the means for making this adjustment is a feature of this invention.

A mounting block 40 is adjustably mounted to the base so it can be adjustably positioned along an axis 41. Slots 42 receive bolt shanks 43, 44 of clamps 45, 46. The clamps have nuts 47, 48 which press block 40 against the base to hold it in a selected location along the axis. When loosened, the block can be slid along the surface of the base.

A pointer 50 is pivotally mounted to the base by a headed, threaded screw 51, which can be tightened down to assist in holding an adjustment. A scale 52 is fixed to the base to show the number of slices that will be made when the block is in a respective position. For this purpose, the pointer is pivotally mounted to the block so that the pointer "follows" its motion.

Figure 3:
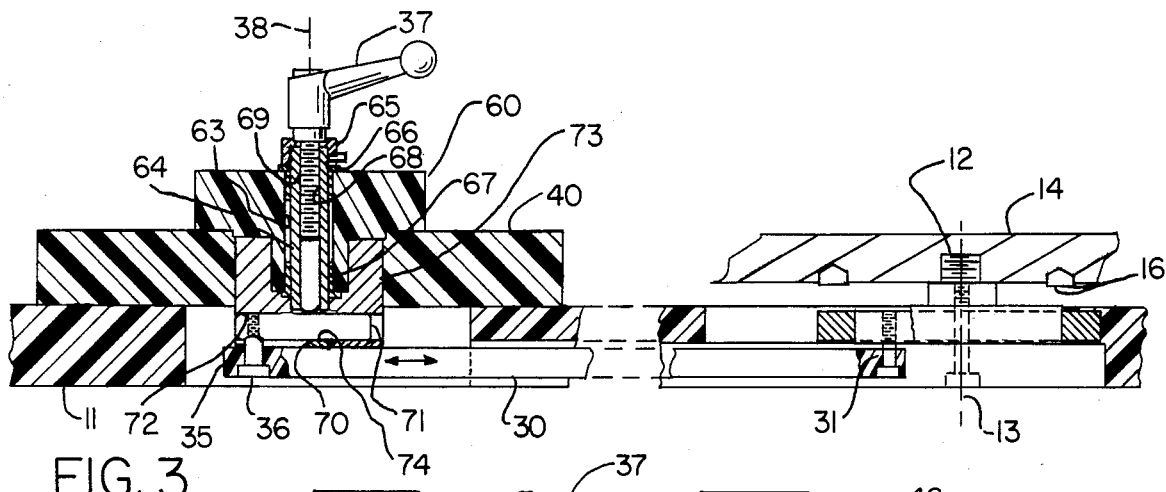
FIG. 3 is a cross-section taken at line 3—3 in FIG. 1.
Figure 4:
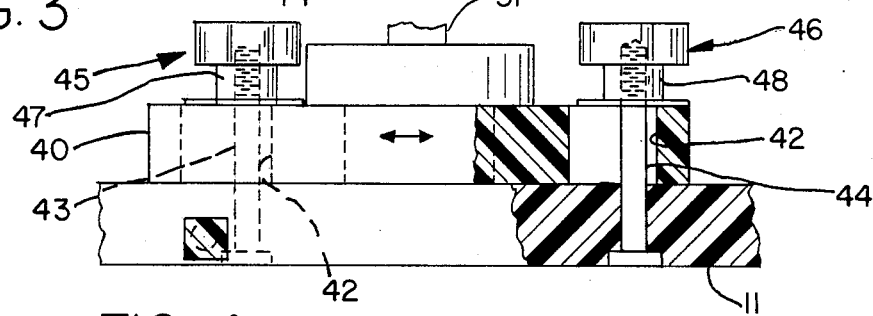
FIG. 4 is a cross-section taken at line 4—4 in FIG. 1.

A cap 60 (FIG. 3) is held to the mount by a pair of bolts 61, 62. A passage 63 passes through it. A stem 64 has an upper collar 65 that bears against sleeve 66. A lower sleeve 67 is also fitted in the passage. This enable the step to turn in the passage. The stem has an internal threaded passage 68 that receives the threaded shank 69 of the handle at its base. The stem is side drilled at 70 to pass a slider 71 which fits in diametral slot 72 in a rotor 73. When the handle 37 is tightened down, it presses the slider against the bottom of the stem (see point 74) and this both tightens the handle against the slider, and also keeps the slider 71 from slipping along slot 72 of the rotor.

Now when the handle 37 and clamps 45 and 46 are loosened, the slider is free to slip in slot 72, so as to follow the movement of the block when it is slid. The movement of slider 71 is relative as slot 72 actually moves with the block along the slider, which is fixed in position relative to the base 11. Finally, the mount is tightened in place, and the handle is tightened, and the "throw" of crank pin 36 is fixed with respect to axis 38.

It is evident that the throw, as determined by the concurrent adjustment of the slider and of the mount, will establish the effective length of the crank.

The device can be actuated by the handle or by an extension of it. However, preferably a pneumatic piston-cylinder assembly 80 will be provided instead. It may be linked to the step or to the rotor by rack gear means, or otherwise as preferred, to substitute for the handle.

The device shown enables ready adjustment of cut size, or number of slices and is adapted accurately to be set by reference to a pointer. The device can be washed or steam cleaned, and is readily disassembled should disassembly be required.

This invention is not to be limited by the embodiment shown in the drawings and described in the description, which is given by way of example and not of limitation, but only in accordance with the scope of the appended claims.

We claim:

1. An indexer to drive a unidirectionally rotatable turntable around a vertical axis, said turntable being adapted to receive unidirectional rotary forces, said indexer comprising: a base, a post having a vertical post axis, said post supporting said turntable for rotation around said vertical axis; an oscillator mounted to the base and rotatable around said post axis unidirectionally to engage and drive said turntable; a crank arm having a vertical crank axis of rotation; pivot means on said crank arm spaced from said crank axis at a throw distance therefrom; a connecting rod interconnecting said oscillator and said pivot means for reciprocably driving said oscillator; mount means mounted to said base which mount means is movable toward and away from said post, said mount means thereby mounting said crank arm to said base for axial movement nearer to and farther from said post selectively to adjust said throw distance; whereby the angular movement of the oscillator can be adjusted to be different for the same angular rotation of the crank arm, said oscillator and said drive means returning to the same starting position after each cycle of turning the crank arm to drive the turntable through the oscillator and return, to have advanced the turntable through an angular increment determined by the length of the throw distance.

2. An indexer according to claim 1 in which a spring tends to return the oscillator to said starting position; and in which said drive means comprises a retractable tang carried by said oscillator.

3. An indexer according to claim 1 in which hold-down means holds the mount in a selected position.

4. An indexer according to claim 3 in which a pointer is pivotally mounted to said base and linked to said mount means to provide together with a scale on the base, an indication of a number of arcuate increments through which the turntable will be advanced in the course of a known total angular movement.

5. An indexer according to claim 4 in which said pivot means includes a slider fitted in a rotor attached to said crank arm and fitted to said mount to which slider said connecting rod is coupled, said mount and said slider being respectively shiftable relative to each other, and the mount being shiftable relative to the base, thereby to provide said adjustment of the crank throw.

* * * * *